UNITED STATES PATENT OFFICE.

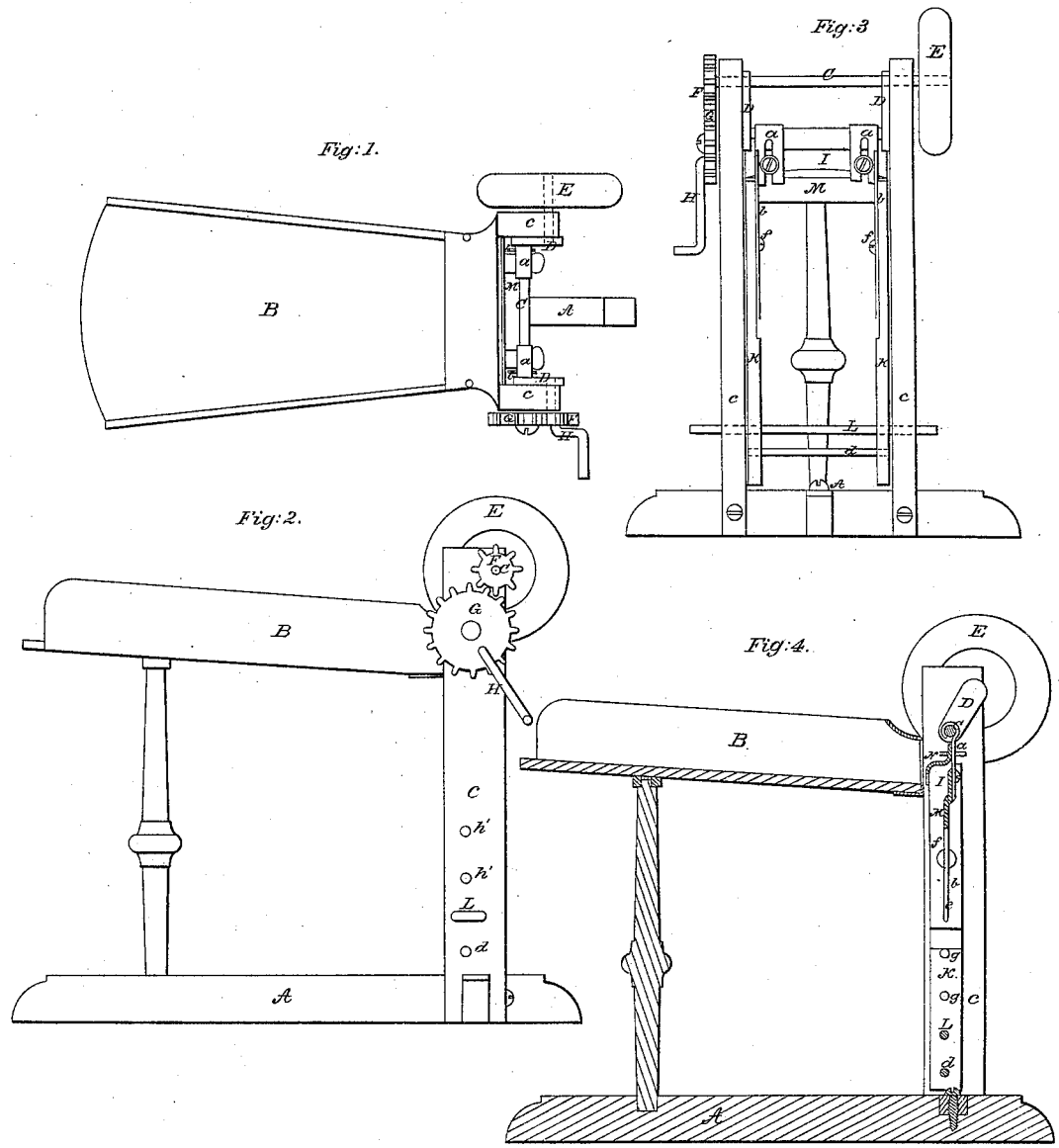

OLIVE ANN BROOKS, OF SOMERSWORTH, NEW HAMPSHIRE, ADMINISTRATRIX OF LEBBIUS BROOKS, DECEASED, OF GREAT FALLS, NEW HAMPSHIRE.

STRAW-CUTTER.

Specification of Letters Patent No. 22,336, dated December 14, 1858.

*To all whom it may concern:*

Be it known that LEBBIUS BROOKS, late of Great Falls, in the county of Strafford and State of New Hampshire, but now deceased, did during his lifetime invent a new and useful or Improved Machine for Cutting or Chopping Straw, Hay, or Various other Matter; and whereas, in trust for the heirs at law of the said deceased, I, OLIVE ANN BROOKS, widow of the said LEBBIUS and administratrix of his estate, have applied to the Commissioner of Patents for Letters Patent on the said invention, now, therefore, I do hereby declare that the said invention is fully described and represented in the following specification and the accompanying drawings, of which—

Figure 1, is a top view of the said machine, Fig. 2, a side elevation of it, Fig. 3, a front end view of it, Fig. 4, a vertical, central and longitudinal section of it.

The nature of the said invention consists in an improved straw cutting machine as constructed with two cutting knives or shears or their equivalents and so that while one of them shall have a compound motion whereby the cutting edge shall be made to move in an elliptical path toward and away from the trough containing the straw or material to be cut, the other shall have only a reciprocating motion in a circular, arc, the lever frame carrying the lower knife or bed being made to turn upon a fulcrum and to be connected with the upper knife by means or mechanism as hereinafter described.

The said invention further consists in the application to the upper knife (operating with a compound motion as described) of a toothed rake so connected with the said knife as to move in accordance therewith and facilitate the feed or forward motion, beyond the trough, of the straw or material to be cut.

In the said machine, the feeding of the straw is effected by the forward movement of the shears or cutting knives.

In the drawings, A, denotes the frame of the machine as supporting a trough, B, and a shaft, C, carrying a long bell crank D, a fly wheel, E, and a pinion, F, the same being arranged as shown in such drawings. The pinion engages with a gear wheel G, arranged on the side of the frame and furnished with a crank, H. By revolving the said crank, a rotary motion will be imparted to the bell crank D. From the wrist of said crank, D, a knife or cutter, I, is suspended by means of two hangers, $a$, $a$, which turn freely on the wrist. The hangers have projections or bars, $b$, $b$, extended downward from them and parallel to one another, and against the inner sides of two levers, K, K, which are supported by and turn on a rod L, extended through posts, $c$, $c$, of the machine and the two levers are connected at their lower ends by a rod, $d$, while at their upper ends, they are fastened to the two extremities of a lower knife or rest, M, which extends through a long slot, $e$, made in each of the parts, $b$, $b$, in manner as shown in Fig. 4. Furthermore a screw, $f$, passes through each of the said slots and into the part, $b$, and has its head projecting laterally beyond the sides of the slot for the purpose of maintaining the part $b$, against the lever, K. Each post, $c$, $c$, of the machine as well as each lever, K, is provided with a series of holes as seen at $g$, $g$, or $h$, $h$, for the reception of the fulcrum rod of the lever, and so that it may be adjusted at different heights in order that the extent of feed of the straw may be varied. There is fastened to the upper knife or blade a toothed rake, N, which during the movement of the knives takes into the straw projecting beyond the inner end of the trough, and facilitates its forward movement. When the crank, H, is put in rotation, the upper knife will be moved in an elliptical path or have a compound motion, composed not only of a reciprocating motion toward and away from the trough but a circular motion by which it will be carried both toward and away from, the lower knife which has imparted to it in the meantime, a reciprocating, vibratory motion in the arc of a circle, and so as to cause it to approach the trough and recede from the same. The lower edge of the upper knife is curved as shown in Fig. 3, in order that in conjunction with the upper edge of the lower knife, it may cut with a drawing stroke during its descent.

A machine made as above described, operates to excellent advantage and besides is very simple in construction, and little liable to get deranged or out of repair.

It is not intended herein to claim a rotary cutter cylinder and a roller for the cutter to work against to feed and cut straw; nor is it intended herein to claim the feeding and cutting straw in the manner described in the specification of the United States Patent, numbered 13807, wherein the knife has a compound motion, composed of two circular motions and operates in conjunction with a roller; nor is it intended herein to claim, a rotary cutter cylinder or set of cutters, and a swinging bed operating together as shown in the United States Patent numbered 12699; nor is it intended herein to claim a straw cutting machine as constructed in such manner, that its bed and knife shall each operate with a compound motion as described in the United States Patent numbered 18084, but

What is claimed herein as the invention of the said LEBBIUS BROOKS, is—

1. An improved straw cutting machine as constructed of two cutting knives or shears, I, M, or their equivalents and so that while one of them, when the machine is in operation, shall have a compound motion whereby its cutting edge shall be made to move in an elliptical path toward and away from the trough, B, the other shall have only a reciprocating motion in a circular arc toward and away from the said trough; the lever frame carrying the lower knife, or bed being made to turn on a fulcrum rod or its equivalent and to be connected with the upper knife by means or mechanism essentially as described.

2. Also, the application to the upper knife, having a compound motion as described, of a toothed rake, N, to operate therewith and facilitate the feeding of the straw forward in manner as specified.

OLIVE ANN BROOKS,
*Administratrix.*

Witnesses:
L. F. HOYT,
W. H. FARRAR.